UNITED STATES PATENT OFFICE.

HENRY D. CHRISTENSEN, OF SPENCER, IOWA.

PROCESS OF MAKING TILE FOR ROOFING AND THE LIKE.

No. 802,914.     Specification of Letters Patent.     Patented Oct. 24, 1905.

Application filed August 27, 1904. Serial No. 222,421.

*To all whom it may concern:*

Be it known that I, HENRY D. CHRISTENSEN, a citizen of the United States, residing at Spencer, in the county of Clay and State of Iowa, have invented certain new and useful Improvements in Processes of Making Tile for Roofing and the Like; and I do declare the following to be a full, clear, and exact description of the invention, such as will enable others skilled in the art to which it appertains to make and use the same.

This invention relates to the manufacture of roofing-tiles, and has particular reference to the composition thereof and the method of combining the ingredients of said composition.

Heretofore roofing-tiles have been made from various cement compositions; but such tiles have been open to the objection that they were either not entirely waterproof or were so heavy as to prevent their being safely used on any but buildings of unusually rigid construction.

I have discovered a composition for use in the manufacture of roofing-tile which is not only absolutely waterproof, but is so light as to be perfectly adapted for use on buildings of any ordinary construction. Furthermore, tiles having my improved composition can be cheaply manufactured and are of attractive appearance, as well as being of great tensile strength.

In the practice of my invention I mix together sand and cement, preferably Portland cement, and add thereto a sufficient amount of water to produce the maximum binding action of the cement on the particles of sand. When the crystallization to which the cement owes its binding or cementing properties has begun, I add and thoroughly incorporate in the sand-and-cement mixture a solution of a silicate of sodium or potassium, and I then place the mixture in the tile-molds. The tile and the molds are then tamped and jarred sharply until the silicate solution is brought to the surface of the tile, thereby closing the pores and rendering the tile waterproof and produces a glossy appearance similar to a fired tile.

By permitting the crystallization of the cement to commence I am able to overcome injurious effect of the silicate solution on the cement, whereby the said crystallization of the cement is neither retarded nor diminished, and a waterproof-tile of relatively light weight is produced which is of great tensile strength and hardness.

The proportions of the sand and cement may be varied in accordance with the character of the said materials, as is the usual practice of those skilled in the art of cement mixing, any of the proportions commonly in use giving satisfactory results. The proportion of the silicate solution to the sand-and-cement mixture may vary from one to one hundred and five per cent., according to the degree of luster, texture, or grain, and the hardness required, one per cent. of the silicate solution producing, in combination with the sand-and-cement mixture, a satisfactory tile for ordinary use at a very low cost of manufacture.

Having thus described my invention, what I claim as novel, and desire to secure by Letters Patent, is—

The process of producing a tile which consists in mixing a solution of an alkaline silicate with a concrete composition, forming the mass into the desired shape in a mold, jarring the mold and contents to bring the solution of the silicate to the upper surface of the mass and drying the said mass, substantially as, and for the purpose described.

In testimony whereof I affix my signature in presence of two witnesses.

HENRY D. CHRISTENSEN.

Witnesses:
  H. H. THOMPSON,
  J. R. HARRISON.